US008038973B2

(12) United States Patent
Ito et al.

(10) Patent No.: US 8,038,973 B2
(45) Date of Patent: Oct. 18, 2011

(54) HIGH PURITY SILICON PRODUCTION SYSTEM AND PRODUCTION METHOD

(75) Inventors: Nobuaki Ito, Futtsu (JP); Kensuke Okazawa, Futtsu (JP); Shinji Tokumaru, Futtsu (JP); Masaki Okajima, Tokyo (JP)

(73) Assignee: Nippon Steel Materials Co., Ltd., Tokyo (JP)

( * ) Notice: Subject to any disclaimer, the term of this patent is extended or adjusted under 35 U.S.C. 154(b) by 0 days.

(21) Appl. No.: 12/086,041

(22) PCT Filed: Jul. 20, 2006

(86) PCT No.: PCT/JP2006/314821
§ 371 (c)(1),
(2), (4) Date: Jun. 3, 2008

(87) PCT Pub. No.: WO2007/066428
PCT Pub. Date: Jun. 14, 2007

(65) Prior Publication Data
US 2009/0155158 A1   Jun. 18, 2009

(30) Foreign Application Priority Data
Dec. 6, 2005   (JP) .................................. 2005-352672

(51) Int. Cl.
*C01B 33/023*   (2006.01)
*B01J 19/12*    (2006.01)
(52) U.S. Cl. .......................... 423/348; 136/261; 422/199
(58) Field of Classification Search ................... 423/438, 423/349; 422/199; 136/261
See application file for complete search history.

(56) References Cited

U.S. PATENT DOCUMENTS

| 2,817,509 | A | * | 12/1957 | Solomon ....................... 266/280 |
| 4,097,584 | A | * | 6/1978 | Reuschel et al. ............. 423/348 |
| 4,304,763 | A | | 12/1981 | Dietl et al. |
| 6,368,403 | B1 | * | 4/2002 | Schmid et al. .................. 117/79 |
| 2005/0139148 | A1 | * | 6/2005 | Fujiwara et al. ................. 117/13 |

FOREIGN PATENT DOCUMENTS
GB   2116956 A1   10/1983
(Continued)

OTHER PUBLICATIONS

Tanahashi, M. et al., Journal of the Mining and Materials Processing Institute of Japan, vol. 118, 2002, p. 497-p. 505.

(Continued)

*Primary Examiner* — Wayne Langel
*Assistant Examiner* — Syed Iqbal
(74) *Attorney, Agent, or Firm* — Kenyon & Kenyon LLP

(57) ABSTRACT

The present invention provides a high purity silicon production system and production method suitable for using inexpensive metallurgical grade metal silicon as a material and using the slag refining method to produce high purity silicon with a purity of 6N or more suitable for solar battery applications, in particular, high purity silicon with a boron content of at least not more than 0.3 mass ppm, inexpensively on an industrial scale, that is, a high purity silicon production system and production method using the slag refining method wherein a direct electromagnetic induction heating means having the function of directly heating the molten silicon in the crucible by electromagnetic induction is arranged outside the outside wall surface of the above crucible and the crucible is formed by an oxidation resistant material at least at a region where the molten silicon contacts the crucible inside wall surface at the time of not powering the direct electromagnetic induction heating means.

18 Claims, 4 Drawing Sheets

FOREIGN PATENT DOCUMENTS

| | | |
|---|---|---|
| JP | 52-144270 A | 12/1977 |
| JP | 56-32319 A | 4/1981 |
| JP | 58-130114 A | 8/1983 |
| JP | 03-122599 | 5/1991 |
| JP | 2001-328872 | 11/2001 |
| JP | 2003-12317 A | 1/2003 |
| JP | 2003-213345 A | 7/2003 |
| JP | 2004-262746 A | 9/2004 |
| JP | 2005-247623 A | 9/2005 |

OTHER PUBLICATIONS

Tanahashi, M., et al., "Resources and Materials," Journal of the Mining and Materials Processing Institute of Japan, vol. 118, 2002, pp. 497-505 (partial translation).

* cited by examiner

HIGH PURITY SILICON PRODUCTION SYSTEM AND PRODUCTION METHOD

TECHNICAL FIELD

The present invention relates to a production system for producing high purity silicon and a high purity silicon production method using the same, more particularly relates to a high purity silicon production system suitable for production of high purity silicon of a purity of 99.9999 mass % (6N) or more suitable for solar battery and other applications by the slag refining method and a high purity silicon production method using the same.

BACKGROUND ART

The silicon (Si) used for solar batteries is generally considered required to have a purity of 6N or more, not have various types of metal impurities more than 0.1 mass ppm, and not have boron (B) of at least more than 0.3 mass ppm. Further, as silicon satisfying these conditions, the superhigh purity silicon of a purity of 11N or more used for semiconductor applications is known.

However, this silicon used for semiconductor applications is produced by the so-called Siemen's process of converting metallurgical grade metal silicon of a purity of 98 mass % or so obtained by reducing silica to silicon chloride, next distilling this silicon chloride, then breaking it down by heat. This requires an extremely complicated production process and extremely strict process control and inevitably increases the production cost. For this reason, silicon for semiconductor applications is excessive in quality, too high in production cost, and therefore not suited for solar battery applications where lower cost is being sought along with the growth in demand.

Therefore, in the past as well, attempts have been made to use inexpensive metallurgical grade metal silicon as the material, refine this by a metallurgical method, in particular, the slag refining method of bringing molten silicon into contact with lower density molten slag to make the impurities in the molten silicon move to the molten slag, and thereby inexpensively produce silicon with a purity of 6N or more suitable for solar battery applications.

For example, Japanese Patent Publication (A) No. 56-32319 describes the method of combining a chemical refining stage and vacuum evaporation under predetermined conditions to refine a metallurgical quality silicon material. In particular, Example 3 describes using an induction heating graphite crucible to indirectly heat and melt a silicon material containing 30 mass ppm of boron together with an industrial purity extraction use melt ($CaF_2+CaO+SiO_2$) through the graphite crucible, holding this at 1450 to 1500° C. for 30 minutes, extracting the melt, then using an induction heating vacuum melting apparatus to vacuum evaporate this under predetermined conditions to produce silicon with a boron content of 8 mass ppm for solar battery applications.

Further, Japanese Patent Publication (A) No. 58-130114 discloses a method of using an ordinary melt furnace such as an electrical resistance furnace or induction furnace, mixing pulverized state crude silicon before melting with slag comprised of alkali earth metal oxides and/or alkali metal oxides or slag ingredients, then melting them and bringing the molten silicon and molten slag into contact to refine the silicon.

Furthermore, Japanese Patent Publication (A) No. 2003-12317 proposes a method for refining silicon provided with a flux addition step of using an alumina crucible and adding to silicon with a boron concentration of 100 mass ppm or less a flux containing CaO, $CaCO_3$, $Na_2O$, or other basic ingredients and melting the same, a reaction step of blowing oxygen, steam, air, carbon dioxide, or another oxidizing gas into the silicon after the end of the flux addition step, and a flux removal step of removing the flux from the silicon after the end of the reaction step.

Further, "Resources and Materials", Vol. 118, p. 497 to 505 (2002) reports an experiment using an electrical resistance furnace provided with a quartz crucible and using an $SiO_2$-saturated $NaO_{0.5}$—CaO—$SiO_2$ type flux containing $NaO_{0.5}$—which is more strongly basic than alkali earth metal oxides—for separation from molten silicon and thermodynamically considers the distribution behavior of boron.

Further, Japanese Patent Publication (A) No. 2003-213345 describes a method of refining metal using an electromagnetic induction heating apparatus which heats a graphite crucible so as to indirectly heat and melt the material silicon and slag material in this crucible, holding the silicon containing boron or carbon or other impurity elements in a molten state, adding an impurity element absorbing medium comprised mainly of CaO to this molten silicon, using a rotary drive mechanism to mechanically agitate the mixture, further introducing a treatment gas containing steam or other oxidizing ingredients reacting with the impurity elements to form a gaseous compound, and expelling the treatment gas through the impurity element absorbing medium to the outside of the molten silicon.

Furthermore, Japanese Patent Publication (A) No. 2005-247623 describes the method of using a very simple atmospheric melting furnace to heat metal silicon containing impurity boron to its melting point to 2200° C. to melt it, adding to this molten silicon a solid mainly comprised of silicon dioxide ($SiO_2$) and a solid mainly comprised of one or both of a carbonate or carbonate hydrate of an alkali metal to form a molten slag, and bringing these molten silicon and molten slag into contact and, further, jointly using the one-directional solidification method or vacuum melting method as needed, so as to reduce the boron in the silicon down to 0.3 mass ppm or less and furthermore down to 0.1 mass ppm or less.

However, to use inexpensive metallurgical grade metal silicon (below, referred to as "the material silicon") as a material to produce high purity silicon suitable for solar battery applications by the slag refining method, in particular high purity silicon with a boron content of at least not more than 0.3 mass ppm, inexpensively on an industrial scale, first, the boron in the molten silicon has to be oxidized or else movement to the molten slag cannot be promoted, so use of a strong boron oxidizing slag material is necessary; second, if considering the distribution ratio expressed by the ratio (B/A) of the mass % concentration A of boron in the molten silicon (% A) and mass % concentration B of boron in the molten slag (% B), the slag material has to be used in a relatively high ratio with respect to the material silicon; and, furthermore, third, a large volume of molten silicon and molten slag, in particular molten silicon, commensurate with the industrial scale has to be uniformly and efficiently heated.

Accordingly, in the methods and systems proposed up to now, for example, even when using $Na_2O$ or another strongly boron oxidizing slag material for slag refining, to reduce the boron content to 0.3 mass ppm or less, it was necessary to use the slag material usually in a ratio of 1000 mass parts or more, preferably 10000 mass parts or more, with respect to 100 mass parts of the material silicon. Further, if melting the entire amount of the slag material in advance and then bringing it into contact with the molten silicon, there is the problem that the strong oxidizing power cannot be sufficiently utilized at the start of melting of the slag material. If trying to produce silicon in large quantities on an industrial scale, too large a size of a crucible has to be used. Further, uniformly and efficiently heating the molten silicon is also difficult. This is just not practical for working on an industrial scale.

DISCLOSURE OF THE INVENTION

Therefore, the inventors engages in various studies to develop a high purity silicon production system able to inexpensively produce high purity silicon suitable for solar battery applications by the slag refining method inexpensively on an industrial scale and as a result discovered that by employing as the heating means a direct electromagnetic induction heating means directly heating the molten silicon in a crucible by electromagnetic induction and, further, forming at least the region of this crucible where the molten silicon contacts the crucible inside wall surface at the time of not powering the direct electromagnetic induction heating means by an oxidation resistant material, it is possible to achieve the object and thereby completed the present invention.

That is, first, the inventors prepared a slag feeding means for feeding slag material on the molten silicon in a crucible and a slag discharging means for discharging the refined slag out of the furnace at the time of slag refining the material silicon, fed the slag material divided into a plurality of batches from the above slag feeding means to the molten silicon in the crucible and used the above slag discharging means to discharge each batch of refined slag outside the furnace at each time so as to thereby keep the size of the crucible used to the minimum necessary size and, further, for the heating means of the molten silicon in the crucible, employed a direct electromagnetic induction heating means for directly heating the molten silicon in the crucible by electromagnetic induction to thereby enable the molten silicon in the crucible to be uniformly and efficiently heated so as to refine the material silicon by slag refining.

According to this method, it is not possible to charge the solid material silicon inside the crucible and melt it by the direct electromagnetic induction heating means, so it is necessary to use another heating means to melt the solid material silicon, then introduce it into the crucible and then directly heat the molten silicon introduced into the crucible by the direct electromagnetic induction heating means, but there is no need to heat the thick crucible wall which was essential in the conventional production systems, so it is possible to quickly raise the molten silicon in the crucible in temperature, the heating efficiency is higher, further, the molten silicon receives an electromagnetic induction stirring action and is stirred more strongly than by the natural convection by just conventional heating, the temperature of the molten silicon is made more uniform and better slag refining can be performed, and, further, a relatively small sized crucible can be used to slag refine a relatively large amount of material silicon at one time to produce high purity silicon.

However, unexpectedly, the region where the molten silicon, which is non-erosive with respect to the crucible, contacts the crucible at the time of no power is more strongly eroded than the region where the molten slag, which is erosive with respect to the crucible, contacts the crucible at the time of no power and as a result the separate problem arises that the crucible life remarkably falls. This phenomenon was not seen when heating a crucible from the outside to indirectly heat the silicon in the crucible. That is, when indirectly heating silicon, at the locations where the molten silicon contacts the crucible at the time of not powering the heating apparatus, almost no erosion of the crucible could be observed, while at the positions where the molten slag contacts the crucible at the time of not powering the heating apparatus, somewhat deep (however, shallower than at the time of directly induction heating the silicon) erosion of the crucible was seen.

Therefore, the inventors proceeded to elucidate the cause of this surprising crucible erosion phenomenon in industrial scale operations and as a result found that when using a direct electromagnetic induction heating means provided with an induction coil surrounding the outer circumference of the side walls of a crucible so as to directly heat the molten silicon in a crucible, the induction force (Lorentz force) acting on the molten silicon in the crucible causes a force (so-called "pinch force") to act on the molten silicon as a whole in the center direction, this pinch force causes a deep gap to form between the crucible inside wall surface and molten silicon reaching down to the bottom of the crucible, the molten slag entering into this gap is sandwiched between the molten silicon higher in temperature than this molten slag and the inside wall surface of the crucible with its abundant heat insulating ability, whereby the slag is heated to a further higher temperature, and as a result the oxidizing power of the molten slag becomes stronger and the crucible inside wall surface at the region where the molten silicon contacts the crucible is strongly eroded. As opposed to this, when indirectly heating the silicon, the slag is cooled by the radiant heat transfer from the top surface of the molten slag open to the atmosphere to the relatively low temperature crucible lid and the average temperature of the molten slag at the parts contacting the crucible falls. The reason why, when indirectly heating molten silicon, the depth by which the molten slag erodes the crucible is shallower than when directly heating the molten silicon is believed to be in part because the temperature of the molten slag at the parts contacting the crucible is lower.

This problem of the crucible erosion phenomenon is not observed even in melting furnaces in the steelmaking field employing a direct electromagnetic induction heating means as the heating means. Up until now, it has only been observed that the center part of the melt in the crucible rises up in a cross-sectional parabolic shape and the upper edges of the melt fall somewhat from the position at the time of no power. This is a distinctive problem occurring when directly heating molten silicon by a direct electromagnetic induction heating means when slag refining material silicon.

Note that in the steelmaking field, the practice is to directly heat the molten steel in a crucible by a direct electromagnetic induction heating means. In this case as well, it may be considered that a gap is formed by the pinch force between the crucible inside wall surface and the molten steel, but in the case of molten steel, the specific gravity is about 3 times greater than that of molten silicon. It is believed that the weight of this molten steel acts as a force closing the gap and that this force overcomes the pinch force maintaining the gap and thereby closes the gap. As opposed to this, in the case of slag refining, there is molten slag on the molten silicon and, further, molten silicon has a smaller specific gravity compared with molten steel, so the pinch force easily causes formation of a gap. Furthermore, the difference in specific gravity between the molten silicon and molten slag is about 20% or less or relatively small. Therefore, it is not possible to prevent the formation of a gap even when applying a relatively small induction magnetic field (for example, a 10 mT or so alternating magnetic field) mainly for the purpose of maintaining the temperature of the molten silicon. Further, the entry of molten slag into this gap cannot be prevented.

The present invention was created based on the above viewpoint and has as its object the provision of a high purity silicon production system suitable for using inexpensive metallurgical grade metal silicon as a material and using the slag refining method to produce high purity silicon of a purity of 6N or more suitable for solar battery applications, in particular high purity silicon with a boron content of at least not more than 0.3 mass ppm, inexpensively on an industrial scale.

Further, another object of the present invention is to provide a high purity silicon production system using inexpensive metallurgical grade metal silicon as a material and using the slag refining method to produce high purity silicon of a purity of 6N or more suitable for solar battery applications, in particular high purity silicon with a boron content of at least not more than 0.3 mass ppm, inexpensively on an industrial scale.

The present invention provides a high purity silicon production system for producing high purity silicon by bringing molten silicon and molten slag with a lower density than the molten silicon into contact in a crucible to make impurities in the molten silicon move into the molten slag, said high purity silicon production system characterized in that a direct electromagnetic induction heating means having the function of directly heating the molten silicon in the crucible by electromagnetic induction is arranged outside the outside wall surface of the above crucible and in that the above crucible is formed by an oxidation resistant material at least at a region where the molten silicon contacts the crucible inside wall surface at the time of not powering the direct electromagnetic induction heating means.

Further, the present invention provides a high purity silicon production method producing high purity silicon by bringing molten silicon and molten slag with a lower density than the molten silicon into contact in a crucible to make impurities in the molten silicon move into the molten slag, said high purity silicon production method characterized by using as the means for heating the above molten silicon a direct electromagnetic induction heating means arranged outside the outside wall surface of the above crucible and using as the crucible a crucible formed by an oxidation resistant material at least at a region where the molten silicon contacts the crucible inside wall surface at the time of not powering the direct electromagnetic induction heating means.

In the present invention, the crucible is formed by an oxidation resistant material alone or a composite material of an oxidation resistant material and a non-oxidation resistant material. Further, the material forming the crucible at the nonoxidation resistant wall should be one which is superior in high temperature strength under the heating temperature during the operation required for slag refining the material silicon (operating temperature), usually the silicon melting temperature of 1415° C. to 2200° C., preferably 1450° C. to 1750° C., further not polluting the molten silicon, and not obstructing direct induction heating of molten silicon by a magnetic field formed by an external direct electromagnetic induction heating means. For example, silicate bricks, mullite bricks, alumina bricks, alumina cement, carbon-SiC composites, etc. may be mentioned. As a crucible not obstructing direct induction heating of molten silicon by a magnetic field formed by an external electromagnetic induction heating means, one using as its material a nonconductive material having a resistance of at least $10^{-4}$ $\Omega$m or more or, when using a conductive material as the material of the crucible, for example one using a composite material comprised of a conductive material into which a nonconductive material is incorporated such as one providing slits in the conductive crucible wall in the crucible axial direction and filling the slits with an insulator etc. so as to prevent the formation of an induced rotating current, may be used. A means using a crucible not obstructing direct induction heating of molten silicon in this way and providing an electromagnetic induction coil etc. at its outside will be called a "direct induction heating means".

Note that strictly speaking, even when using a conductive material to construct a crucible, the magnetic field created by the electromagnetic induction heating apparatus is not completely blocked by the crucible, so in general an induction current and pinch force act on the molten silicon and heat generation and agitation are caused in the silicon melt. However, in the case of a large sized crucible used for industrial production, generally the crucible has a thickness of at least 10 mm or more to maintain its strength. Here, for example, when using a crucible with an electrical resistance of $10^{-4}$ $\Omega$M or less, the amount of heat generated by the induction current induced in the molten silicon by the magnetic field permeating the crucible is at least about 1% or less of the total amount of heat input to the furnace. Just because such secondary weak induction heating occurs in the molten silicon, such heating cannot be called a direct induction heating method of molten silicon. In practice, the phenomenon of molten slag entering the part of the crucible which the molten silicon contacts at the time of no power, deemed remarkable at the time of direct induction heating of molten silicon, is not observed at all when only such a weak pinch force occurs.

Further, the region where the inside wall surface of this crucible and molten silicon contact has to be formed by an oxidation resistant material, not contaminate the molten silicon under the operating temperature conditions, and not obstruct direct induction heating of the molten silicon by the magnetic field formed by an external direct electromagnetic induction heating means. Further, when using an oxidation resistant material alone to form the crucible, not only oxidation resistance, but also high temperature strength is necessary. Furthermore, the oxidation resistant material should be present at least at the molten silicon contact region which the molten silicon contacts at the time of not powering the direct electromagnetic induction heating means. For example, it may be a lining material provided at the inside wall surface of the crucible by the method of adhering oxidation resistant material tile by an oxidation resistant adhesive, the method of spraying an oxidation resistant material to a predetermined thickness, the method of arranging castable refractories between the oxidation resistant material and external crucible to hold the oxidation resistant material in the crucible, the method of holding the oxidation resistant materials together without using an adhesive etc. by a dome-shaped combination etc. utilizing gravity, or another method. Further, at least the molten silicon contact region of the crucible wall itself may be formed by an oxidation resistant material. Furthermore, the entire crucible wall itself may be formed by an oxidation resistant material.

Further, this oxidation resistant material may be suitably selected considering the oxidation resistance with respect to the slag material (molten slag) required by the crucible under the heating temperature at the time of a slag refining operation, but preferably is one or more types of materials selected from the group comprising magnesia, mullite, alumina, silicon nitride, and silicon carbide or a material of these materials including silica as a main ingredient (for example, silica, silicate glass, kaolin, etc.)

Further, the inside wall of this crucible formed by an oxidation resistant material preferably has a porosity of 1% to 20% since at the time of the slag refining operation, the strongly oxidizing molten slag contacts it and, further, the slag material is fed divided into a plurality of batches and the refined slag is discharged out of the furnace with each batch, so for example if using a tilting device as the slag discharging means, the molten silicon will be rocked inside the crucible with each discharge of this refined slag and a heat shock will be given to the inside wall of the crucible. If the porosity of the wall of this crucible formed by the oxidation resistant material is higher than 20%, the erosion resistance will fall, while conversely if lower than 1%, the erosion resistance will be improved, but the wall will become weak against heat shock and will easily break. In both cases, the crucible life will become shorter. As the method for controlling the porosity of the wall of the crucible formed by the oxidation resistant material, a method generally employed in the ceramic industry may be employed. For example, it is possible to suitably select the sintering aid added, the particle size of the crucible material, the heating temperature, heating time, and other production conditions at the time of crucible production, etc. to thereby control the process of sintering between particles forming the crucible and produce a wall formed by an oxidation resistant material with the target porosity. Furthermore, as the method for measuring the porosity of the wall of the crucible formed by an oxidation resistant material as well, this may be found by a general method, for example, using the ratio between the apparent specific gravity and true specific gravity of the crucible.

In the present invention, in the slag refining operating, it is necessary to feed the slag material divided into a plurality of batches and to further discharge the refined slag outside of the furnace with each batch, so preferably the system is provided with a slag feeding means for feeding the slag material into the crucible such as a hopper system, pneumatic conveyance system, conveyor system, screw conveyance system, or other slag feed device and with a slag discharging means for discharging the refined molten slag in the crucible outside of the furnace such as a tilting device or slag suction device.

Further, regarding the above slag feeding means, in particular when producing high purity silicon for solar battery applications with a boron concentration of 0.3 mass ppm or less by the slag refining method, as the slag material, it is necessary to use a mixture of an impurity trapping material for trapping the impurities in the molten silicon moving from the molten silicon to the molten slag and an impurity oxidizing agent for oxidizing the impurities in the molten silicon to facilitate movement from the molten silicon to the molten slag, so preferably provision is made of an impurity trapping material feeding device for feeding the impurity trapping material into the crucible and an impurity oxidizing agent feeding device for feeding the impurity oxidizing agent into the crucible. Furthermore, for the impurity oxidizing agent, since feeding it in the solid state to the molten silicon in the crucible enables its strong oxidizing power to be more effectively utilized, more preferably the impurity oxidizing agent feeding device or this impurity oxidizing agent feeding device and impurity trapping material feeding device can feed at least part of the impurity oxidizing agent or part of the impurity oxidizing agent and impurity trapping material in the solid state to the molten silicon in the crucible.

Further, as the impurity trapping material of the above slag material, for example, one or a mixture of two or more materials selected from the group comprising alumina, silica, calcium oxide, and halogenated calcium can be mentioned. Further, as the impurity oxidizing agent of the above slag material, one or a mixture of two or more materials selected from the group comprising a carbonate, carbonate hydrate, and hydroxide of an alkali metal and a carbonate, carbonate hydrate, and hydroxide of an alkali earth metal. Further, as the alkali metal or alkali earth metal forming the impurity oxidizing agent, lithium, sodium, potassium, magnesium, calcium, barium, etc. may be illustrated. Further, as specific examples of this impurity oxidizing agent, sodium carbonate, potassium carbonate, sodium hydrogen carbonate, potassium hydrogen carbonate, magnesium carbonate, calcium carbonate, or their hydrates, magnesium hydroxide, sodium hydroxide, calcium hydroxide, etc. may be illustrated.

The high purity silicon production system of the present invention is not particularly limited, but at the time of a slag refining operation, first a separately prepared melting apparatus is used to melt the material silicon, the entire amount of the obtained molten silicon is charged into the crucible and heated (or held) by a direct electromagnetic induction heating means to a predetermined temperature, next one batch of a slag material comprised of an impurity trapping material and impurity oxidizing agent is fed by a slag feeding means (one batch of the slag material fed divided into a plurality of batches) in the molten state and/or solid state on to the molten silicon in the crucible, the state of the molten stag remaining on the molten silicon is held for a predetermined time for refining, then the refined slag is discharged by a slag discharging means to outside the furnace (below, the operation performed using one batch of slag material fed divided into this plurality of batches being referred to as a "unit operation"), this operation is repeated a plurality of times, then the molten silicon after the end of the slag refining is transferred to a dedicated discharge crucible and allowed to solidify, and the high purity silicon obtained by one cycle of the slag refining operation is recovered.

According to the high purity silicon production system and production method of the present invention, the molten silicon in the crucible is directly heated by the direct electromagnetic induction heating means and the problem of the crucible erosion phenomenon occurring at this time is solved by forming at least the molten silicon contact region of the crucible by a high oxidation resistant wall made of an oxidation resistant material, so it is possible to use an inexpensive metallurgical grade metal silicon as a material and use the slag refining method to produce high purity silicon of a purity of 6N or more suitable for solar battery applications, in particular high purity silicon with a boron content of at least not more than 0.3 mass ppm, inexpensively on an industrial scale.

BEST MODE FOR CARRYING OUT THE INVENTION

Below, the best mode for carrying out the present invention will be specifically explained based on the examples shown in the attached drawings.

Figure 1:
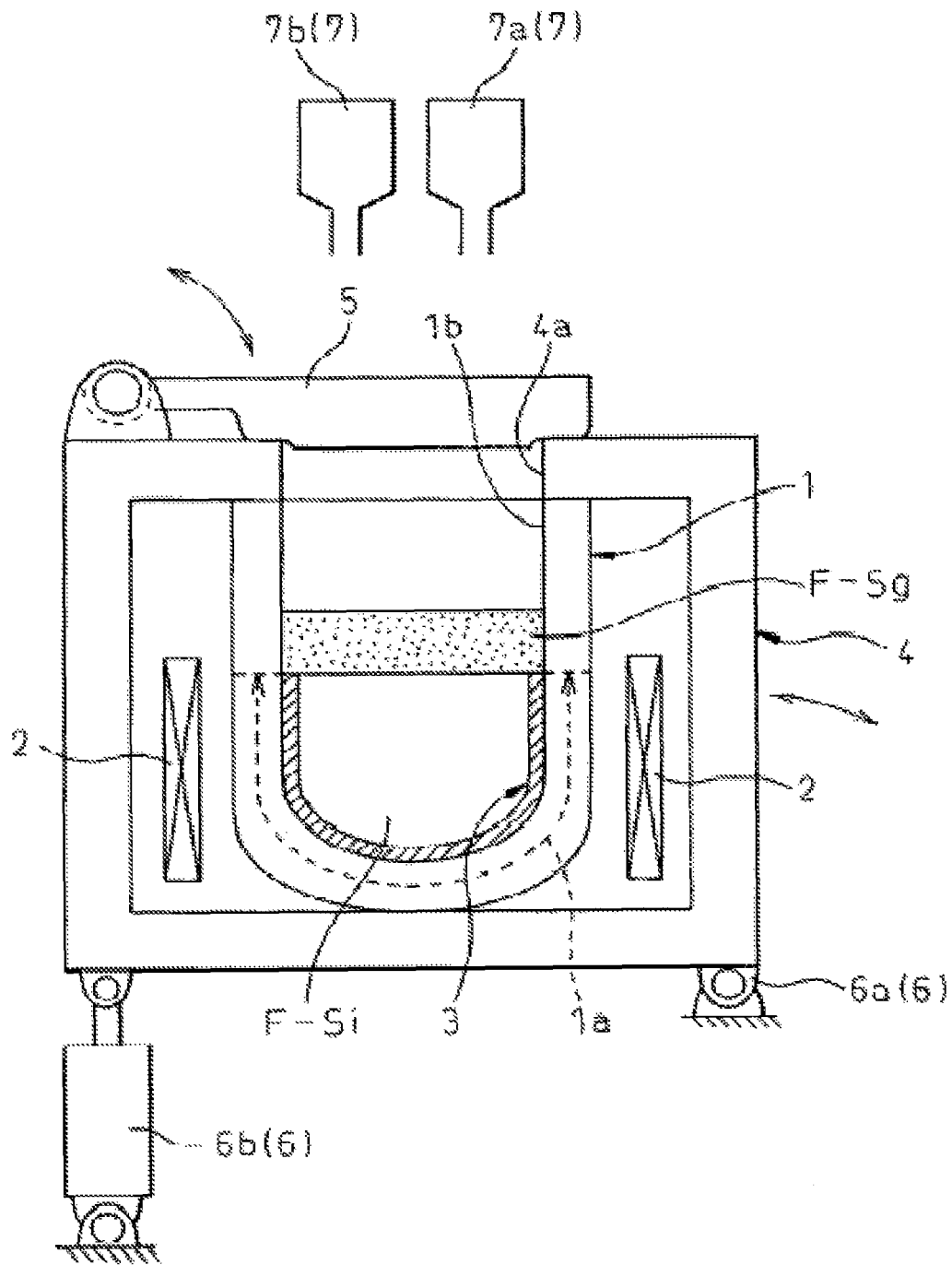
FIG. 1 is an explanatory view showing a conceptual view of a high purity silicon production system according to an example of the present invention.

FIG. 1 is a conceptual view of a high purity silicon production system according to an example of the present invention. This high purity silicon production system is provided with a crucible body 1 for holding molten silicon (hereinafter described as "F—Si") and molten slag of a lower density than this molten silicon F—Si (hereinafter referred to as "F—Sg") for slag refining under heating, an induction coil (direct electromagnetic induction heating means) 2 arranged so as to surround the crucible body 1 at the outside of the outside wall surface of the crucible body 1 and directly heating the molten silicon F—Si in the crucible by electromagnetic induction heating, and a lining material (high oxidation resistant wall) 3 made of an oxidation resistant material provided at the entire molten silicon contact region 1a of the crucible body 1 which the molten silicon F—Si contacts at the time of not powering the induction coil 2.

Further, in this example, the above crucible body 1 and induction coil 2 are housed in a furnace body 4 made of an insulating material provided with an opening 4a corresponding to a top opening 1b of the crucible body 1. Further, this furnace body 4 is provided at its top with a lid 5 able to open and close to block or open the opening 4a of the furnace body 4 and is provided at its bottom with a tilt device 6 comprised of a bearing 6a attached to one end of the furnace body 4 and an extension mechanism 6b attached to the other end. Furthermore, above the opening 4a, there is arranged a slag feeding hopper (slag feeding means) 7 comprising an impurity trapping material hopper (impurity trapping material feeding device) 7a for feeding the impurity trapping material forming the slag material to the inside of the crucible body 1 and an impurity oxidizing agent hopper 7b (impurity oxidizing agent feeding device) for feeding the impurity oxidizing agent forming the slag material to the inside of the crucible body 1.

Therefore, according to the high purity silicon production system of this example, first, a not shown melting apparatus is used to melt the material silicon, the entire amount of the obtained molten silicon F—Si is poured into the crucible body 1, the lid 5 is closed, next the induction coil 2 is powered to start induction heating of the molten silicon F—Si, the molten silicon F—Si is heated to a predetermined operating temperature of its melting temperature (1415° C.) to 2200° C., then it is held at that temperature.

Next, the lid 5 of the furnace 4 is opened, the impurity trapping material hopper 7a and impurity oxidizing agent hopper 7b charge predetermined amounts (amounts corresponding to one batch of slag material fed divided into a plurality of batches) of the impurity trapping material and the impurity oxidizing agent over the molten silicon F—Si in the crucible body 1, the lid 5 is again closed, molten slag F—Sg is made to form over the molten silicon F—Si, and this is held for a predetermined time at a predetermined operating temperature for slag refining.

After the end of this slag refining, the lid 5 is opened and the tilt device 6 is operated to tilt the crucible body 1 along with the furnace body 4 until a predetermined angle to discharge only the molten slag F—Sg inside the crucible body 1, then the tilt device 6 is again operated to restore the crucible body 1 together with the furnace body 4 to the original upright state.

The above operation is designated as a unit operation which is repeated a predetermined number of times until the predetermined amount of slag material, fed divided into a plurality of batches, is consumed, then the tilt device 6 is operated to completely tilt the crucible body 1 together with the furnace body 4 to transfer the molten silicon F—Si after the end of the slag refining to a not shown dedicated discharge crucible, then the molten silicon F—Si is allowed to solidify in this discharge crucible to end one cycle of the slag refining operation and obtain the product high purity silicon.

Figure 2:
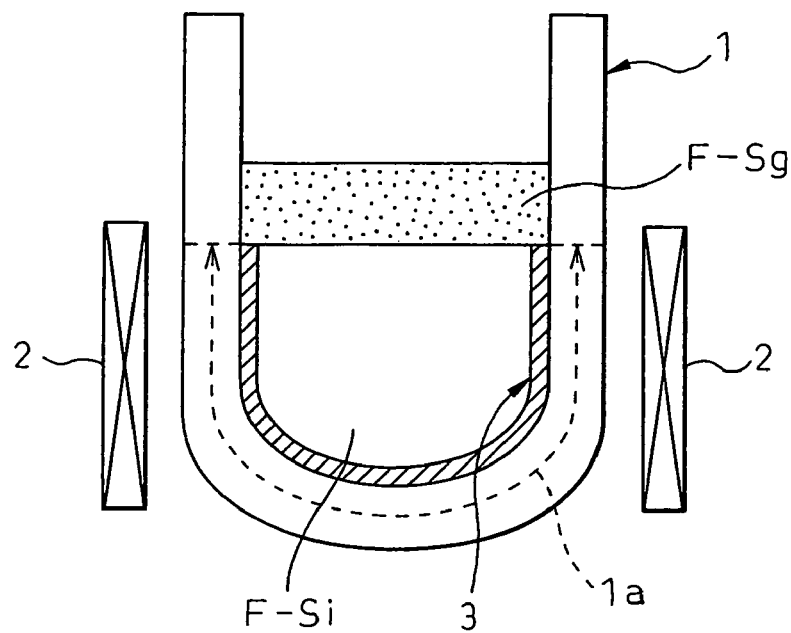
FIG. 2 is an explanatory view for explaining the states of the molten silicon and molten slag in a crucible body at the time of not powering the induction coil in the process of a slag refining operation.
Figure 3:
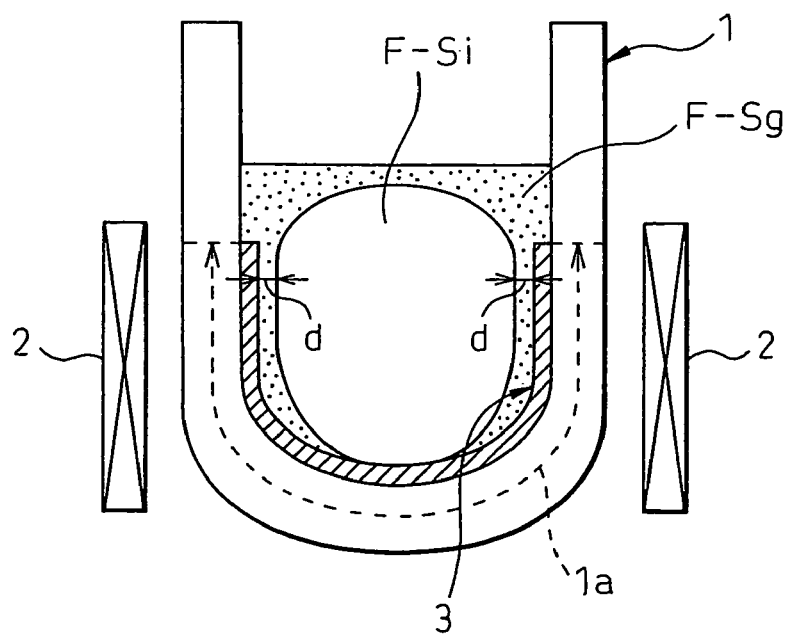
FIG. 3 is an explanatory view similar to FIG. 2 for explaining the states of the molten silicon and molten slag in a crucible body at the time of powering the induction coil in the process of a slag refining operation.

In the process of this one cycle of the slag refining operation, between the molten silicon F—Si and the molten slag F—Sg housed in the crucible body 1, as shown in FIG. 2 and FIG. 3, at the time of not powering the induction coil 2 (see FIG. 2), the molten silicon F—Si contacts the molten silicon contact region 1a of the crucible body 1 where the lining material 3 is provided, while at the time of powering the induction coil 2 (see FIG. 3), the molten silicon F—Si in the crucible body 1 is acted on by an induction force (Lorentz force), whereby a pinch force acts on the molten silicon F—Si, a deep gap d reaching the crucible bottom is formed between this molten silicon F—Si and the lining material 3, part of the molten slag F—Sg enters this gap d, and the molten slag F—Sg entering this gap d is heated by the molten silicon F—Si of a higher temperature than the temperature of the molten slag F—Sg and becomes a higher temperature than the temperature of the molten slag F—Sg positioned above the molten silicon contact region 1a of the crucible body 1.

Therefore, by selecting the oxidation resistant material of the lining material 3 provided at the molten silicon contact region 1a of the crucible body 1 considering the erosion of the lining material 3 by the molten slag F—Sg entering the gap d when heated to the operating temperature of the molten silicon F—Si (1415° C. to 2200° C.), it is possible to solve the problem of erosion of the crucible body 1.

EXAMPLES

Example 1

In the high purity silicon production system provided with the furnace configuration shown in FIG. 1, as the crucible body, a crucible made of alumina cement of a size of an outside diameter 870 mm×inside diameter 820 mm×height 900 mm was used. Further, for the molten silicon contact region, a lining material made of the oxidation resistant material shown in Table 1 having an inside diameter 780 mm×thickness 10 mm, having a porosity shown in Table 1, and formed integral as a whole (high oxidation resistant wall) was provided by injecting castable refractories and fixing with the inside wall surface of the crucible body. Furthermore, as the direct electromagnetic induction heating means, a 5 kHz output induction coil was used.

Further, 500 kg of general commercially available metal silicon with a purity of 99.6 mass % containing, as metal impurities, iron (Fe) in 3000 mass ppm, aluminum (Al) in 500 mass ppm, calcium (Ca) in 100 mass ppm, and phosphorus (P) in 40 mass ppm and having a boron content of 40 mass ppm was used as the material silicon. Further, for the slag material, the impurity trapping material and impurity oxidizing agent shown in Table 1 were used in amounts of 1500 kg, respectively.

Furthermore, regarding the operating conditions, the solid slag material was charged divided into 30 batches and one cycle of the slag refining operation was performed by 30 unit operations. The operating temperature at each unit operation was made 1600° C., while the holding time at the operating temperature after charging the slag material was made 1 hour.

A sample was taken using a cutter from the product silicon obtained after solidification after one cycle of slag refining. The obtained sample was measured by inductively coupled plasma mass spectrometry for the boron concentration.

Further, in the same way as the above, the slag refining operation of the material silicon was performed for 100 cycles. The boron concentrations of the samples obtained in these 100 cycles of slag refining operation were found and averaged to obtain the boron concentration of the product silicon in the Examples (B concentration). Further, the state of corrosion of the lining material after 100 cycles of the slag refining operation was investigated by disassembling the crucible. The durability of the lining material was evaluated by the presence of any crucible through holes or other critical damage.

The results are as shown in Table 1. The durability was excellent.

Example 2

Except for using a lining material having the porosity shown in Table 2 and made of the oxidation resistant material shown in Table 2 (high oxidation resistant wall) and using the slag material shown in Table 2, the same procedure was performed as in the above Example 1 to produce product silicon. Further, the same procedure was performed as in the above Example 1 to investigate the boron concentration of the product silicon (B concentration) and the state of corrosion of the lining material after 100 cycles of the slag refining operation and evaluate the durability.

The results are as shown in Table 2. The durability was excellent.

TABLE 1

| Lining material | | Slag material | | | |
|---|---|---|---|---|---|
| Oxidation resistant material | Porosity (%) | Impurity trapping material | Impurity oxidizing agent | B concentration (mass ppm) | Durability evaluation |
| Magnesia | 8 | Alumina (10 mass %) + silica (40 mass %) | $K_2CO_3$ (50 mass %) | 0.09 | ○ |
| | | Quartz glass (50 mass %) | $Ca(OH)_2$ (50 mass %) | 0.06 | ○ |
| Mullite | 3 | Silica (50 mass %) | $NaHCO_3$ (50 mass %) | 0.10 | ○ |
| | | Quartz glass (50 mass %) | NaOH (50 mass %) | 0.12 | ○ |
| Alumina | 10 | Silica (50 mass %) | $Na_2CO_3$ (50 mass %) | 0.11 | ○ |
| | | Alumina (10 mass %) + silica (40 mass %) | $KHCO_3$ (50 mass %) | 0.09 | ○ |
| Silicon nitride | 8 | Alumina (20 mass %) + silica (30 mass %) | $KHCO_3$ (50 mass %) | 0.20 | ○ |
| | | Silica (50 mass %) | $Mg(OH)_2$ (50 mass %) | 0.17 | ○ |
| Silicon carbide | 5 | Quartz glass (50 mass %) | $MgCO_3$ (50 mass %) | 0.15 | ○ |
| | | Silica (50 mass %) | NaOH (50 mass %) | 0.18 | ○ |

(Note)
○ (Good): no crucible through holes

TABLE 2

| Lining material | | Slag material | | | |
|---|---|---|---|---|---|
| Oxidation resistant material | Porosity (%) | Impurity trapping material | Impurity oxidizing agent | B concentration (mass ppm) | Durability evaluation |
| Alumina (50 mass %) + silicon nitride (50 mass %) | 5 | Alumina (10 mass %) + silica (40 mass %) | $K_2CO_3$ (50 mass %) | 0.10 | ○ |
| | | Quartz glass (50 mass %) | $Ca(OH)_2$ (50 mass %) | 0.11 | ○ |
| Alumina (50 mass %) + silicon carbide (50 mass %) | 4 | Silica (50 mass %) | $NaHCO_3$ (50 mass %) | 0.09 | ○ |
| | | Quartz glass (50 mass %) | NaOH (50 mass %) | 0.09 | ○ |
| Alumina (80 mass %) + mullite (20 mass %) | 7 | Silica (50 mass %) | $Na_2CO_3$ (50 mass %) | 0.11 | ○ |
| | | Alumina (10 mass %) + silica (40 mass %) | KOH (50 mass %) | 0.12 | ○ |
| Silicon carbide (95 mass %) + silica (5 mass %) | 15 | Alumina (20 mass %) + silica (30 mass %) | $KHCO_3$ (50 mass %) | 0.09 | ○ |
| | | Silica (50 mass %) | $Mg(OH)_2$ (50 mass %) | 0.10 | ○ |
| Magnesia (95 mass %) + silica (5 mass %) | 12 | Quartz glass (50 mass %) | $MgCO_3$ (50 mass %) | 0.10 | ○ |
| | | Silica (50 mass %) | NaOH (50 mass %) | 0.11 | ○ |

(Note)
○ (Good): no crucible through holes

Example 3

Figure 4:
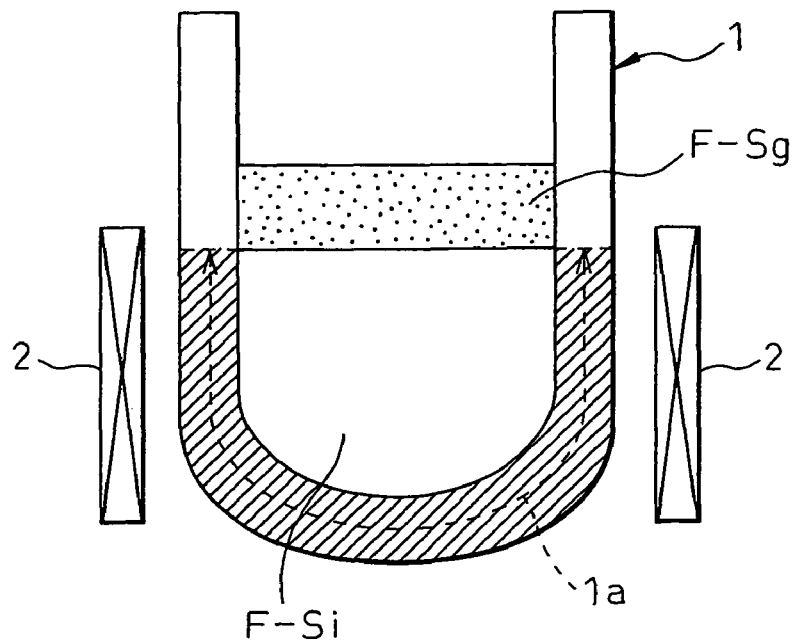
FIG. 4 is an explanatory view similar to FIG. 2 for explaining the crucible body used in the slag refining operation of Example 3.

As shown in FIG. 4, except for having the molten silicon contact region 1a of the crucible body 1 comprised of a wall formed by the oxidation resistant material shown in Table 3 and having a porosity shown in Table 3, having the other parts made of a wall comprised of porosity 30% alumina bricks, and using the slag material shown in Table 3, the same procedure was performed as in the above Example 1 to produce the product silicon. Further, the same procedure was performed as in the above Example 1 to investigate the boron concentration of the product silicon (B concentration) and the state of corrosion of the crucible wall after 100 cycles of slag refining operation and evaluate the durability. Further, this crucible body 1 was prepared by adhering the joint parts between the wall of the molten silicon contact region 1a and the wall of the other parts.

The results are as shown in Table 3. The durability was excellent.

Test Example 1

The crucible inside wall surface was divided into 24 sections in the peripheral direction. At each section, in the same way as the case of Example 1, a lining material formed by the same oxidation resistant material but different in porosity (high oxidation resistant wall) was arranged and slag refining was performed to produce product silicon. At this time, as the oxidation resistant material of the lining material, silicon nitride, silicon carbide, mullite, alumina, and magnesia were used. Further, the porosities of the lining material provided in the above 24 sections were made 0.3%, 0.5%, 0.7%, 1%, 2%, 3%, 4%, 5%, 6%, 7%, 8%, 9%, 10%, 12%, 14%, 16%, 18%, 20%, 22%, 24%, 26%, 30%, 35%, and 40%.

Further, a large number of thermocouples were arranged at the outside wall surface of the crucible corresponding to the above sections so as to measure the temperature during the slag refining operating and monitor when through holes were formed in the crucible and molten silicon and/or molten slag leaked out. At this time, when the temperature detected by a

TABLE 3

| High oxidation resistant wall | | Slag material | | | |
| --- | --- | --- | --- | --- | --- |
| Oxidation resistant material | Porosity (%) | Impurity trapping material | Impurity oxidizing agent | B concentration (mass ppm) | Durability evaluation |
| Magnesia | 10 | Alumina (10 mass %) + silica (40 mass %) | $K_2CO_3$ (50 mass %) | 0.10 | ○ |
| | | Quartz glass (50 mass %) | $Ca(OH)_2$ (50 mass %) | 0.09 | ○ |
| Mullite | 7 | Silica (50 mass %) | $NaHCO_3$ (50 mass %) | 0.11 | ○ |
| | | Quartz glass (50 mass %) | NaOH (50 mass %) | 0.12 | ○ |
| Alumina | 12 | Silica (50 mass %) | $Na_2CO_3$ (50 mass %) | 0.11 | ○ |
| | | Alumina (10 mass %) + silica (40 mass %) | $KHCO_3$ (50 mass %) | 0.10 | ○ |

(Note)
○ (Good): no crucible through holes

Example 4

Figure 5:
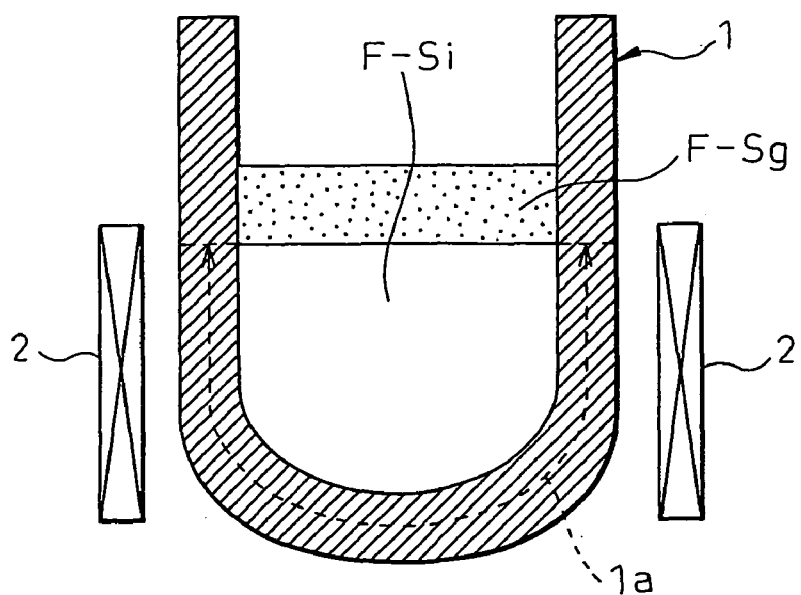
FIG. 5 is an explanatory view similar to FIG. 2 for explaining the crucible body used in the slag refining operation of Example 4.

As shown in FIG. 5, except for having the entire crucible body 1 comprised of a wall formed by the oxidation resistant material shown in Table 4 and having the porosity shown in Table 4 and using the slag material shown in Table 4, the same procedure was performed as in the above Example 1 to produce product silicon. Further, the same procedure was performed as in the above Example 1 to investigate the boron concentration of the product silicon (B concentration) and the state of corrosion of the crucible wall after 100 cycles of slag refining operation and evaluate the durability.

The results are as shown in 4. The durability was excellent.

thermocouple at a certain section exceeded a predetermined value discovered in advance by experiments, it was deemed that a through hole had been formed at that section. With each cycle of slag refining, the lining material of any section where a through hole was formed was replaced and the section of the crucible where the through hole was formed was built up to repair it, then the next cycle of slag refining was continued. The number of cycles of slag refining performed until replacement of the lining material at a certain section was defined as the number of cycles of possible use with the porosity of the lining material used for that section.

Figure 6:
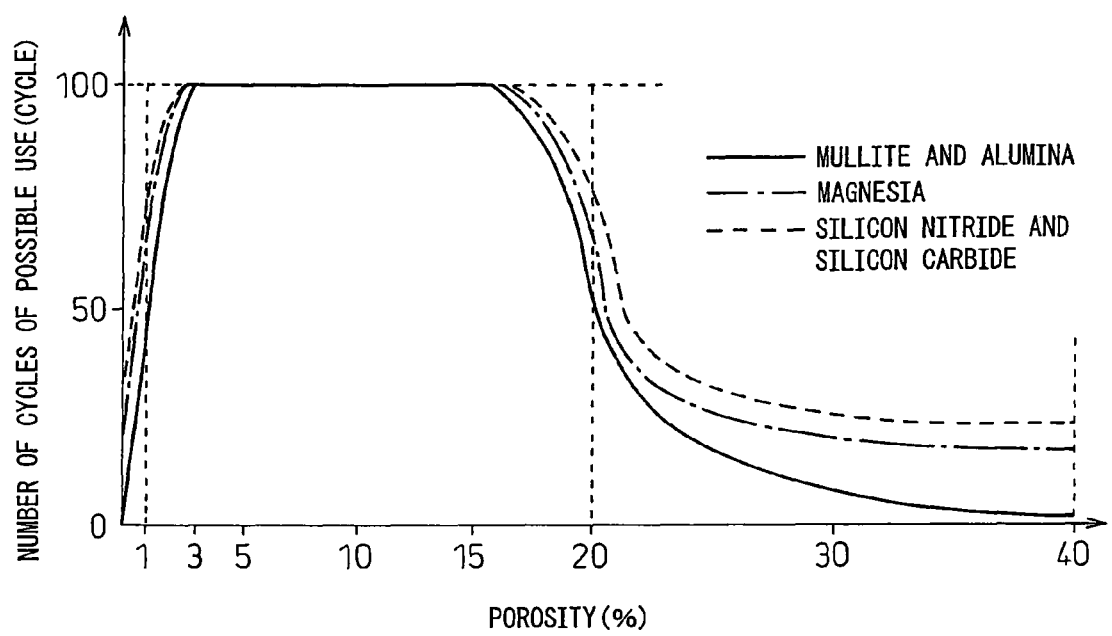
FIG. 6 is a graph showing the relationship between the porosity (%) of a high oxidation resistant wall found in Test Example 1 and the number of cycles of possible use in slag refining.

The obtained results of the series of tests are shown in FIG. 6. Note that on the abscissa showing 100 cycles of possible use in FIG. 6, the solid line showing mullite and alumina, the

TABLE 4

| High oxidation resistant wall | | Slag material | | | |
| --- | --- | --- | --- | --- | --- |
| Oxidation resistant material | Porosity (%) | Impurity trapping material | Impurity oxidizing agent | B concentration (mass ppm) | Durability evaluation |
| Silicon nitride | 10 | Alumina (20 mass %) + silica (30 mass %) | $KHCO_3$ (50 mass %) | 0.20 | ○ |
| | | Silica (50 mass %) | $Mg(OH)_2$ (50 mass %) | 0.18 | ○ |
| Silicon carbide | 8 | Quartz glass (50 mass %) | $MgCO_3$ (50 mass %) | 0.14 | ○ |
| | | Silica (50 mass %) | NaOH (50 mass %) | 0.18 | ○ |

(Note)
○ (Good): No crucible through holes broken line showing magnesia, and the dotted line showing silicon nitride and silicon carbide overlap. The number of cycles of possible use is preferably in the range of a porosity of 1% to 20% in the case of each oxidation resistant material.

Comparative Example 1

Except for using zirconium oxide as the material in the molten silicon contact region of the crucible body and providing a porosity 10% lining material (high oxidation resistant wall), the same procedure was performed as in the above Example 1 for a slag refining operation of the material silicon, but zirconium oxide melt loss occurred and the lining material had to be replaced by just three cycles of the slag refining operation.

Comparative Example 2

Except for using silicate bricks as the material in the molten silicon contact region of the crucible body and providing a porosity 20% lining material (high oxidation resistant wall), the same procedure was performed as in the above Example 1 for a slag refining operation of the material silicon, but crucible through holes were formed and the operation was suspended by just a single cycle of the slag refining operation.

INDUSTRIAL APPLICABILITY

According to the high purity silicon production system of the present invention and the high purity silicon production method using the same, it is possible to use inexpensive metallurgical grade metal silicon as a material and use slag refining method to produce high purity silicon with a purity of 6N or more, in particular high purity silicon with a boron content of at least not more than 0.3 mass ppm, inexpensively on an industrial scale, so the invention has high industrial value in the production of high purity silicon suitable for solar battery applications where lower cost has been sought along with the growth in demand.

The invention claimed is:
1. A high purity silicon production apparatus for producing high purity silicon comprising:
   (a) a crucible for holding molten silicon and molten slag with a lower density than the molten silicon; and
   (b) a direct electromagnetic induction heating means comprising an electromagnetic induction coil arranged outside the outside wall surface of the crucible for applying electromagnetic induction on molten silicon inside said crucible thereby providing direct heating to said molten silicon; wherein the crucible is electrically non-conductive to induction current by said electromagnetic induction coil and does not obstruct direct induction heating of said molten silicon, and wherein the crucible comprises an oxidation resistant material at least at a region where the molten silicon contacts the crucible inside wall surface when not powering the direct electromagnetic induction heating means.
2. A high purity silicon production apparatus as set forth in claim 1, wherein said oxidation resistant material is a lining material provided at least at a region where the molten silicon contacts the crucible inside wall surface.
3. A high purity silicon production apparatus as set forth in claim 1, wherein said crucible is formed by an oxidation resistant material at least at a region where the molten silicon contacts its wall.
4. A high purity silicon production apparatus as set forth in claim 3, wherein said crucible is formed by an oxidation resistant material at its entire wall.
5. A high purity silicon production apparatus as set forth in claim 1, wherein said oxidation resistant material is one or more types of materials selected from the group consisting of magnesia, mullite, alumina, and silicon nitride, or these materials including silica as a main ingredient.
6. A high purity silicon production apparatus as set forth in claim 1, wherein said oxidation resistant material has a porosity of 1 to 20%.
7. A high purity silicon production apparatus as set forth in claim 1, wherein slag material of the molten slag is comprised of an impurity trapping material trapping impurities in the molten silicon moving from molten silicon to the molten slag and an impurity oxidizing agent oxidizing the impurities in the molten silicon to make them easily move from the molten silicon to the molten slag.
8. A high purity silicon production apparatus as set forth in claim 7, wherein said impurity trapping material is one or a mixture of two or more materials selected from the group consisting of alumina, silica, calcium oxide, and halogenated calcium.
9. A high purity silicon production apparatus as set forth in claim 7, wherein said impurity oxidizing agent is one or a mixture of two or more materials selected from a carbonate, carbonate hydrate, and hydroxide of an alkali metal and a carbonate, carbonate hydrate, hydroxide, and oxide of an alkali earth metal.
10. A high purity silicon production apparatus as set forth in claim 1, further comprising a slag feeding means for feeding a slag material into said crucible.
11. A high purity silicon production apparatus as set forth in claim 10, wherein said slag feeding means is provided with an impurity trapping material feeding device for feeding an impurity trapping material into the crucible and an impurity oxidizing agent feeding device for feeding an impurity oxidizing agent into the crucible.
12. A high purity silicon production apparatus as set forth in claim 11, wherein said impurity oxidizing agent feeding device or said impurity oxidizing agent feeding device and said impurity trapping material feeding device are able to feed at least part of the impurity oxidizing agent or part of the impurity oxidizing agent and impurity trapping material in a solid state on the molten silicon in the crucible.
13. A high purity silicon production apparatus as set forth in claim 1, further comprising a slag discharging means for discharging refined molten slag from said crucible outside of the furnace.
14. A high purity silicon production apparatus as set forth in claim 13, wherein said slag discharging means is a tilting device for making crucible tilt to discharge refined molten slag in the crucible outside of the furnace.
15. A high purity silicon production apparatus as set forth in claim 1, wherein said crucible is formed by a non-conducting material.
16. A high purity silicon production apparatus as set forth in claim 15, wherein said non-conducting material is selected from the group consisting of silicate, mullite, and alumina.
17. A high purity silicon production apparatus as set forth in claim 1, wherein said crucible is formed by a composite material comprising both a conductive material and a non-conductive material such that a current is not induced in said crucible.
18. A high purity silicon production method for producing high purity silicon, comprising:

(a) bringing molten silicon and a molten slag having a lower density than the molten silicon into contact with each other in a crucible such that impurities in the molten silicon move into the molten slag; and
(b) heating the molten silicon using a direct electromagnetic induction heating means comprising an electromagnetic induction coil arranged outside an outside wall surface of the crucible, wherein said direct electromagnetic induction heating means applies electromagnetic induction on said molten silicon inside said crucible thereby providing direct heating to said molten silicon; and wherein said crucible is electrically non-conductive to induction current by said electromagnetic induction coil and does not obstruct direct induction heating of said molten silicon, and wherein said crucible comprises an oxidation resistant material at least at a region where the molten silicon contacts the crucible inside wall surface when not powering the direct electromagnetic induction heating means.

* * * * *